United States Patent [19]

Ishida et al.

[11] 4,455,281

[45] Jun. 19, 1984

[54] PLATE-SHAPED CATALYST UNIT FOR NOX REDUCTION OF EXHAUST GAS

[75] Inventors: Nobuyoshi Ishida; Yoshihide Kondo; Kunihiko Konishi; Hiroyuki Kamio, all of Hiroshima, Japan

[73] Assignee: Babcock-Hitachi Kabushiki Kaisha, Tokyo, Japan

[21] Appl. No.: 254,600

[22] Filed: Apr. 16, 1981

Related U.S. Application Data

[62] Division of Ser. No. 966,945, Dec. 6, 1978, Pat. No. 4,285,838.

[30] Foreign Application Priority Data

Dec. 8, 1977 [JP] Japan .................. 52-146583
Dec. 8, 1977 [JP] Japan .................. 52-146584

[51] Int. Cl.$^3$ .................................. B01D 53/36
[52] U.S. Cl. ................... 422/171; 55/524; 423/239; 423/213.2; 427/427; 502/527
[58] Field of Search ........... 422/171, 176, 177, 169, 422/170; 427/427; 252/466 J, 474, 477; 423/210.5, 213.2, 213.5, 235, 239; 55/68, 524

[56] References Cited

U.S. PATENT DOCUMENTS

| | | | |
|---|---|---|---|
| 3,006,782 | 10/1961 | Wheildon, Jr. | 427/427 X |
| 3,560,408 | 2/1971 | Kiehl et al. | 252/477 R X |
| 3,640,755 | 2/1972 | Barth | 427/427 X |
| 3,773,894 | 11/1973 | Bernstein et al. | 252/474 X |
| 3,886,095 | 5/1975 | Ford et al. | 252/466 J X |
| 3,922,234 | 11/1975 | Bunda et al. | 423/213.5 X |
| 3,969,480 | 7/1976 | Fedor et al. | 252/477 R X |
| 4,021,372 | 5/1977 | Meguerian et al. | 252/477 R X |
| 4,069,171 | 1/1978 | Lemkey et al. | 252/477 R X |
| 4,282,115 | 8/1981 | Atsukawa et al. | 423/213.2 X |

FOREIGN PATENT DOCUMENTS

| | | | |
|---|---|---|---|
| 51-52363 | 5/1976 | Japan. | |
| 937466 | 9/1963 | United Kingdom | 422/171 |

Primary Examiner—Richard L. Chiesa
Attorney, Agent, or Firm—Koda and Androlia

[57] ABSTRACT

The present invention relates to a plate-shaped catalyst unit for NOx reduction of exhaust gas, wherein molten metal is sprayed upon surfaces of a metal plate allowing the molten metal to accumulate thereon to form rough surfaces, and the rough surfaces thus obtained are deposited with a catalytic substance for NOx reduction of exhaust gas.

The catalyst units thus obtained are each disposed in parallel with the gas flow, and generally arranged across the gas flow and at intervals in the catalytic reactor which is placed in an exhaust gas duct and used as an apparatus for nitrogen oxides (NOx) reduction of exhaust gas.

3 Claims, 28 Drawing Figures

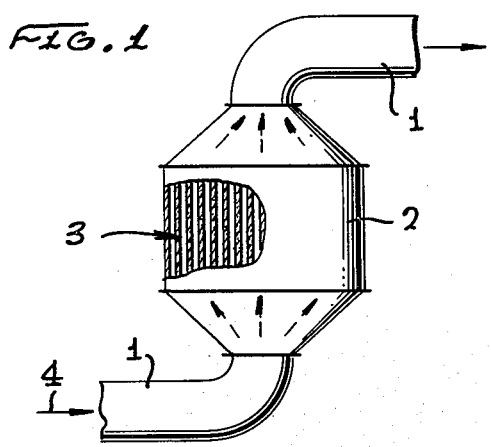
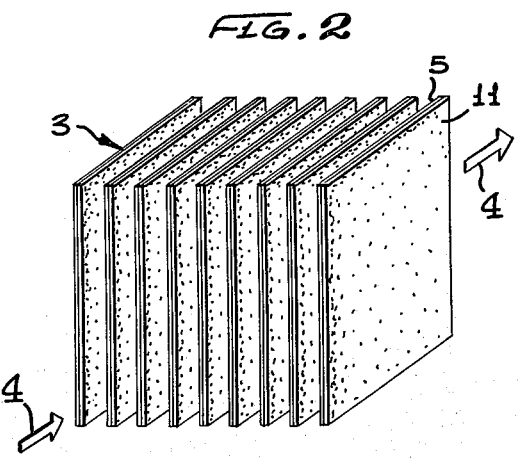
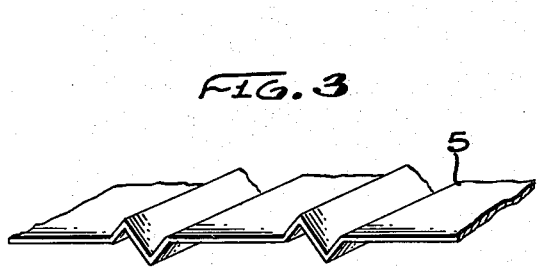
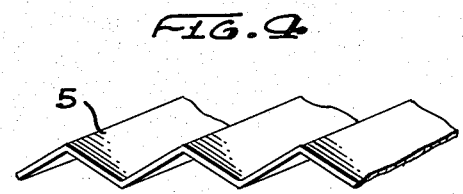
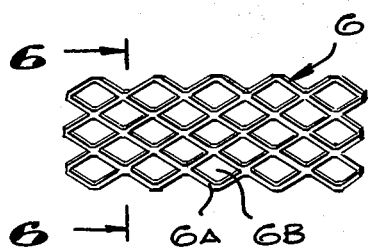
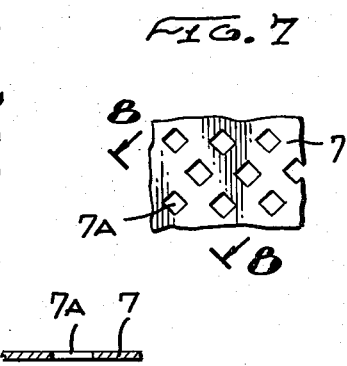
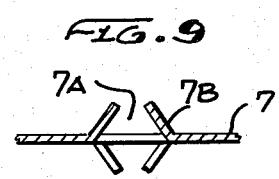
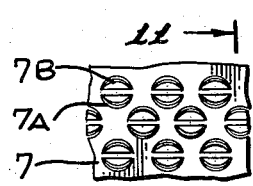
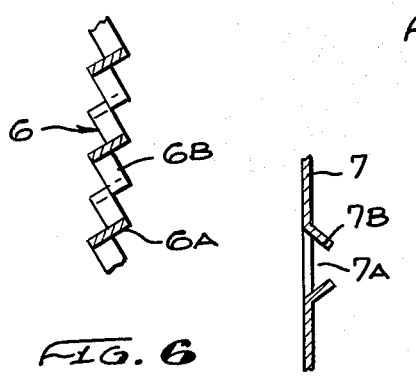
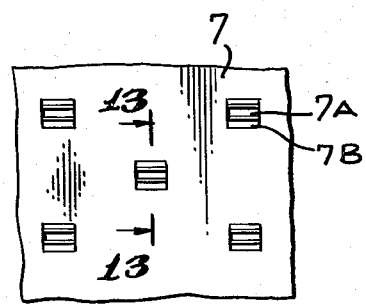
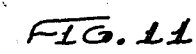

PLATE-SHAPED CATALYST UNIT FOR NOX REDUCTION OF EXHAUST GAS

This is a division of application Ser. No. 966,945, filed Dec. 6, 1978, and now U.S. Pat. No. 4,285,838.

BACKGROUND OF THE INVENTION

1. Field of the Invention

The present invention relates to a catalyst unit for use in reducing and removing nitrogen oxides (NOx) contained in the exhaust gas.

2. Description of the Prior Art

Heretofore, it has been known that, in order to remove Nox contained in the exhaust gas from combustion apparatuses, it is effective that such a reducing agent as ammonia is fed in gaseous phase to a highly heated portion at the outlet of the combustion apparatus or a duct for exhaust gas to reduce and remove NOx. The typical reactions which take place in the cases described above are as follows:

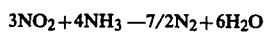

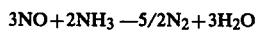

In order to satisfactorily carry out the reduction of NOx described above, the presence of catalyst is essential, and in general, a catalytic reactor is provided downstream of an ammonia pouring point in an exhaust gas duct. As catalytic substances used in reducing NOx contained in the exhaust gas by means of ammonia, there have been known, for example, titanium (Ti) and vanadium (V) according to Japanese Patent Kokai (Laid-Open) Publication No. 128680/75; titanium (Ti), wolfram (W) and one or more out of vanadium (V), molybdenum (Mo) and iron (Fe) according to Japanese Patent Kokai (Laid-Open) Publication No. 128681/75; and titanium (Ti), Vanadium (V) and molybdenum (Mo), or, iron (Fe) according to Japanese Patent Kokai (Laid-Open) Publication No. 52363/76. The above-described catalytic substances are formed into slurry or paste in the state of hydroxide or water-soluble salt, adding thereto a suitable carrier where necessary, and resultant slurry or paste is coated on a substrate of the catalyst, and thereafter dried and calcined to be attached onto the substrate for use. Finally, the catalytic substances are attached onto said substrates in the state of oxide or sulfate.

Heretofore, the states of use of catalytic units for decreasing nitrogen oxides contained in the exhaust gas include (1) an arrangement of layers of granular catalyst contained in a vessel, (2) an arrangement of a multiplicity of cylindrical catalyst units whose axes are in parallel with the flow of gas; and (3) an arrangement of a multiplicity of plate-shaped catalyst units made of metal plate or wire mesh on which a catalytic substance is attached and being parallel with the flow of gas. However, with the above-described arrangement (1), there is encountered with such a problem that, when the exhaust gas containing a large amount of soot and smoke, dust are built up in the layers of catalyst to increase loss in pressure, whereby the flows of gas within the layers of catalyst are deviated, resulting in difficult removal of soot and dust therefrom. Further, with the above-described arrangement (2), there are presented such problems that, in addition to the problem in the arrangement (1), the working surface area as the catalyst is small as compared with the volume occupied by itself. Furthermore, with the above-described arrangement (3), the dust build-up within the catalyst units is small and loss in pressure is low, but there is such a disadvantage that the catalytic substance attached to the metal plate or wire mesh tends to fall off. For instance, in the case a metal plate is used, the catalytic substance attached thereto falls off through slight deformation or contact because the outer surfaces thereof are flat and smooth. Additionally, in the case a wire mesh is used, because of low strength and rigidity thereof, the wire mesh tends to be deformed, whereby cracks are caused to the catalyst portion, resulting in fall-off of the catalytic substance.

OBJECT OF THE INVENTION

An object of the present invention is to provide a method of producing a plate-shaped catalyst unit for NOx reduction of exhaust gas wherein the catalytic substance is prevented from falling off.

Another object of the present invention is to provide an apparatus for NOx reduction of exhaust gas wherein the aforesaid plate-shaped catalyst units are arranged such that deviation in the flow of gas decreases.

Further objects of the present invention will hereunder be made apparent by the following description.

BRIEF SUMMARY OF THE INVENTION

In accordance with the present invention, there is provided a method of producing a catalyst unit for NOx reduction of exhaust gas, wherein: molten metal is sprayed upon surfaces of a metal plate allowing the molten metal to accumulate thereon to form rough surfaces; and the rough surfaces thus obtained are deposited with a catalytic substance for NOx reduction of exhaust gas.

In accordance with the present invention, there is also provided a method of producing a catalyst unit for NOx reduction of exhaust gas, characterized in that: molten metal is sprayed on both surfaces of a perforated metal plate allowing the molten metal to accumulate thereon to form rough surfaces; the rough surfaces thus obtained are deposited with a catalytic substance for NOx reduction of exhaust gas; and layers of catalytic substance disposed at opposite sides of the metal plate are jointed to each other through perforations.

The present invention will now be described with reference to the accompanying drawings wherein are set forth by way of illustration and example, certain embodiments of this invention.

BRIEF DESCRIPTION OF THE DRAWINGS

FIG. 1 is a cross-sectional view showing the catalytic reactor incorporating the plate-shaped catalyst unit according to the present invention;

FIG. 2 is a partial oblique view of the plate-shaped catalyst unit shown in FIG. 1;

FIGS. 3 and 4 are partial oblique views respectively showing embodiments of the metal plates used in the plate-shaped catalyst unit according to the present invention;

FIG. 5 is a partial plan view showing the expanded metal as an embodiment of the perforated metal plate according to the present invention;

FIG. 6 is a cross-sectional view taken along the line of VI—VI in FIG. 5;

FIGS. 7, 10 and 12 are partial plan views respectively showing other embodiments of the perforated metal plate according to the present invention;

FIGS. 8, 11 and 13 are cross-sectional views taken along the lines VIII—VIII, XI—XI and XIII—XIII in FIGS. 7, 10 and 12, respectively;

FIG. 9 is a partial cross-sectional view showing a further embodiment of the perforated metal plate according to the present invention;

DETAILED DESCRIPTION OF THE PREFERRED EMBODIMENTS

Figure 14:
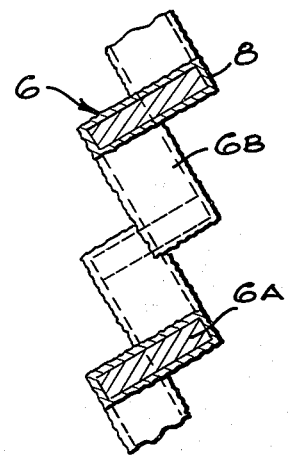
FIG. 14 is a cross-sectional view showing the metal portion of the expanded metal on which molten metal is sprayed according to the present invention.

Referring to the drawings, FIG. 1 is a partly broken away sectional view showing a catalytic reactor 2 provided on a duct 1 through which exhaust gas containing NOx, and FIG. 2 is an oblique view showing a plate-shaped catalyst unit 3 incorporated in the above-mentioned catalytic reactor. As shown, in the catalytic reactor 2, a plurality of catalyst units 3 are each disposed in parallel with the gas flow 4, and generally arranged across the gas flow and at regular intervals in the catalytic reactor 2. Each plate-shaped catalyst unit 3 is formed of a metal plate 5, on both sides of which catalytic substance 11 is attached.

According to the present invention, there are used not only the flat metal plate 5 shown in FIG. 2 but also flat plates subjected to bending work as shown in FIGS. 3 and 4. In the use of the bent flat plates shown in FIGS. 3 and 4, when those plates are piled up, bent portions hold spaces therebetween, whereby spacers which would otherwise be necessary can be saved, resulting in increased catalytic area.

As further examples of the metal plate 5 according to the present invention, expanded metals 6 shown in FIGS. 5 and 6 can be enumerated.

An expanded metal refers to a screen-shaped thin metal plate wherein a multiplicity of slits of short length are rendered in alternate and intermittent manner and tensile force is applied perpendicularly to those slits to form meshes. As shown in FIG. 5, the expanded metal 6 consists of metal portions 6A constituting meshes and openings 6B, and as shown in FIG. 6, the metal portions 6A are inclined relative to the horizontal plane.

As still further examples of the metal plate 5 according to the present invention, perforated plates as shown in FIGS. 7, 8, 9, 10, 11, 12 and 13 are enumerated. The perforated plates 7 shown in FIGS. 7 and 8 are ones wherein a multiplicity of opening 7A are penetrated through metal plates by use of means such as a press. Further, the perforated plate 7 shown in FIG. 9 is one wherein a multiplicity of letter 'I' shaped slits are penetrated through a metal plate and those slits are pressed open upwardly or downwardly to thereby form openings 7A and projections 7B. The perforated plates 7 shown in FIGS. 10 and 11 are ones wherein a multiplicity of pairs of semicircular slits are penetrated through a metal plate and those slits are pressed open to one side to thereby form openings 7A and projections 7B. Furthermore, the perforated plates 7 shown in FIGS. 12 and 13 are ones wherein a multiplicity of rectangular slits are penetrated through the metal plate and those slits are pressed open to one side to thereby form openings 7A and projections 7B.

It must be understood that the shapes of openings 7A are not limited to the above-described embodiments, and variations such as triangular and polygonal can be adopted.

It is desirable that the ratio of the total area of the openings of the aforesaid perforated plate to the total area of the flat plate does not exceed 60%. Also it is preferable to make the diameter or side of a single hole of perforation to be 5 mm or less. In case the ratio of the total area of the openings of the metal plate to the total area of the flat plate is larger than 60%, the strength of the metal plate constituting the substrate becomes insufficient as viewed from the unbalance in relationship between the strength of the metal plate and the weight of the catalyst, so that the catalyst tends to fall off.

The size and thickness of the aforesaid metal plate is suitably selected depending on the dimensions of the apparatus for exhaust gas denitrification, the amount of catalyst to be held by the metal plate. The thickness is preferably thin, but toughness of the metal plate is required in order not to easily yield to deformation.

As the materials for the aforesaid metal plate, such materials are used that which is not deformed by the heat due to molten metal spraying to be described hereinafter and has heat resistance and corrosion resistance sufficient to stand the use in the atmosphere of high temperature gas (between 300° and 400° C.). Such materials as described above include thin steel plates, especially, thin stainless steel plates such as ASTM type 430, type 410 and type 304.

According to the present invention, forming the surfaces of the aforesaid metal plate into rough surfaces is effected by molten metal spraying. The molten metal spraying is such a process that metallic particles in a condition where said particles are molten or heated by utilizing combustion or electric energy to a temperature close to the melting point are sprayed upon the surfaces of the metal plate allowing the metallic particles to accumulate thereon. In the typical case, a metal wire is heated to be molten by contact resistance of electricity, an electric arc or high temperature flames, and molten metal thus obtained are sprayed together with gas such as compressed air through nozzles on the surfaces of the metal plate in the forms of very small droplets of molten metal allowing the molten metal to solidly secured thereto. As the molten metal sprayed, the same type of material as the aforesaid metal plate is preferred. Then, a catalytic substance is attached onto the surfaces of the metal plate formed into rough surfaces by the molten metal spraying. As the catalytic substance, for example, a combination of Ti and V, a combination of Ti and W with one out of V, Mo and Fe, and a combination of Ti and V with one out of Mo and Fe, among which, especially, a combination including Mo, such as the combination of Ti and V with Mo, is highly resistant to the harm from sulfur compounds contained in the exhaust gas and has good adhering property to the surfaces of the metal plate according to the present invention. Furthermore, the combination of Ti, V and Mo with W or Fe has further improved adhering property and heat resistance. Those catalytic substances are mixed in the form of particles at the predetermined ratio of composition, kneaded together with a suitable binder, and either coated on the surfaces of the aforesaid metal plate in the state of paste or coated on the surfaces of the metal plate by dipping the metal plate in a slurry of the aforesaid catalytic substances. An inorganic fibrous filler material may be mixed with the paste or slurry described above so as to further improve adhering property of the catalyst to the surfaces of the metal plate. As the examples of such fillers, heat-resistant and corrosion-resistant materials such as glass fibers, metal chips and asbestos can be enumerated. From among those, particularly, glass fibers are preferable. The content of filler material in the aforesaid catalyst composition may preferably be 0.1 to 10% by weight. Mixing such fillers as described above with the catalytic substance will significantly increase the adhering force of the catalyst.

In the case the metal plate has openings, the catalytic substance is held by the openings of the metal plate, and further, it is desirable that portions of the catalytic substance disposed at opposite sides of the metal plate are cohered to each other through the openings. Thus, the catalyst layers disposed at the opposite sides of the metal plate are anchored through the openings, so that the extent of cohesion of the catalyst can be increased. Additionally, this effect can be further facilitated by mixing a filler with the catalyst.

As described above, the metal plate applied thereon with the catalytic substance is calcined at a temperature ranging from about 300° to 500° C. to be formed into a plate-shaped catalyst unit according to the present invention.

Figure 15:
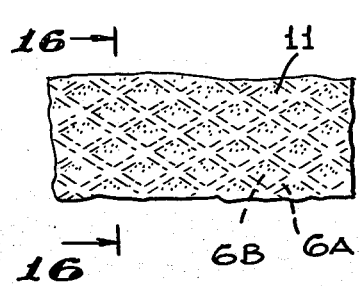
FIG. 15 is a plan view showing the plate-shaped catalyst unit according to the present invention, wherein catalytic substance is attached to the expanded metal shown in FIG. 5, on which molten metal is sprayed.
Figure 16:
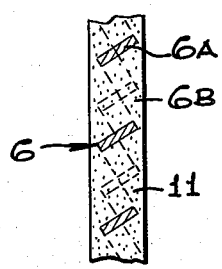
FIG. 16 is a cross-sectional view thereof.
Figure 18:
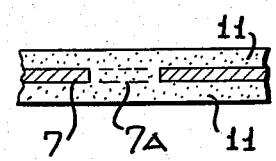
FIGS. 18, 19, 20 and 21 are cross-sectional views respectively showing the plate-shaped catalyst units according to the present invention, wherein the catalyst is attached to the surface of the perforated metal plate 7 shown in FIGS. 8, 9, 11 and 13, on which molten metal is sprayed.
Figure 20:
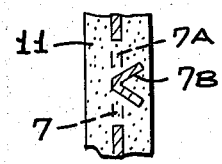
Figure 17:
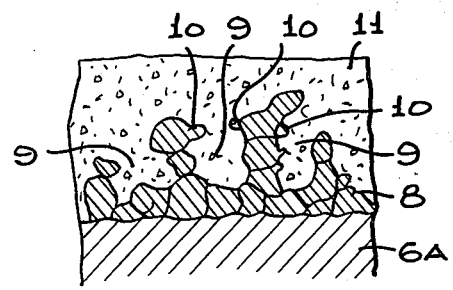
FIG. 17 is a sketch of a sectional microphotograph of the plate-shaped catalyst unit shown in FIG. 15.
Figure 19:
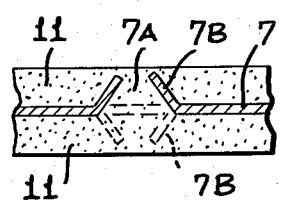
Figure 21:
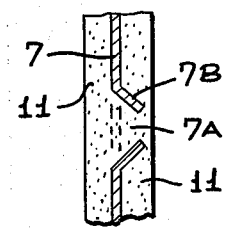

FIG. 14 is an enlarged cross-sectional view showing the metal portion 6A when molten metal has been sprayed upon the expanded metal as shown in FIG. 5. FIGS. 15 and 16 are drawings showing the state where catalytic substance is attached to the expanded metal formed into rough surfaces by molten metal spraying as shown in FIGS. 5 and 6. Further, FIG. 17 is a schematic diagram showing a microphotographic cross-section of the expanded metal to which the catalytic substance is attached. In this case, as the material for both the metal plate and the molten metal sprayed, ASTM type 304 stainless steel (the so-called 13 chromium steel) is used.

As shown, the so-called metallized layers where small metallic particles 8 are piled up are formed on the opposite surfaces of the metal portions 6A of the expanded metal, the piled-up small metallic particles form a multiplicity of small open cavities 9, and very small metallic particles 10 are attached to the walls of the cavities. When the catalytic substance 11 is attached to the wall surfaces, the catalytic substance is firmly secured by those irregular small open cavities 9 and the very small metallic particles 10 attached to the wall surfaces. The depths of the cavities 9 in this embodiment is within the range from 0.1 to 0.3 mm and the diameters of the small metallic particles 10 within the range from about 1 to 100μ.

Furthermore, in the case the catalytic substance mixed with the aforesaid inorganic fibrous filler material is attached to the metal plate, the filler material interlocks with the very small metallic particles 10, the filler material and the catalyst are formed into an integral substance which adheres to the walls of the small open cavities 9 unremovably therefrom, and the irregularity of the cavities in shape makes the cohesion of the catalyst layers thereto to be further firmer. On the other hand, even if cracks are caused to the catalyst layers due to the thermal expansion and thermal shrinkage which are alternately repeated, the catalytic substance is highly resistant to falling-off because said substance is mixed with the fibers. The above-described fibrous filler material is usable in such a form that short fibers are mixed with long ones.

The shape of the surface of metal plate and the state of adhesion of the catalytic substance as shown in FIG. 17 are applicable not only to the expanded metal but also to the metal plates having various shapes.

When an expanded metal is used as the metal plate, the expanded metal itself has an irregular shape, the catalyst layers disposed at opposite sides of the expanded metal are connected to each other through the openings 6B, and rough surfaces made of small metallic particles are formed on the surfaces of the metal, whereby the adhering force of the catalyst is increased, thereby enabling to minimize the fall-off of the catalytic substance. Additionally, heat distortion during molten metal spraying can be made small as compared with the case of the flat plate.

FIGS. 18, 19, 20 and 21 are cross-sectional views respectively showing the plate-shaped catalyst units according to the present invention wherein molten metals are sprayed upon the surfaces of the perforated metal plates 7 shown in FIGS. 8, 9, 11 and 13 so as to form catalyst layers thereon. In this case also, rough surfaces made of small metallic particles are formed on the surface of the metal plates, the catalyst layers disposed at the opposite sides of the metal plates are connected to each other through the openings 7A, and projections 7B are formed around the openings 7A, whereby the adhering force of the catalyst is increased, thereby enabling to minimize the fall-off of the catalytic substance. Additionally, heat distortion during molten metal spraying can be made small as compared with the flat plate without openings.

Description will hereunder be made of the results of the catalyst peel-off tests conducted on the plate-shaped catalyst units manufactured according to the present invention. Three types of test samples were used which include (a) a catalytic substance is coated on the metal plate upon which molten metal has been sprayed, (b) the same sample as in (a) except for glass fibers are mixed with the catalytic substance, and (c) a catalytic substance is attached to a metal plate by means of press means. The test samples as described above were each dropped from the height of 1 m onto the iron plate ten times and the decreases of the samples in weight (peel rate) due to the peel-off of the catalytic substance were measured. As the result, the peel rates of the samples (c) were 10 to 50% according to the conventional method, whereas the peel rates of the samples (a) and (b) were 5 to 7% and about 3%, respectively.

In the case of the aforesaid plate-shaped catalyst units are each disposed in parallel with the exhaust gas flow and generally arranged across the exhaust gas flow to form such an assembly as shown in FIG. 2 for example, a catalytic apparatus for NOx reduction of exhaust gas can be provided in which the catalyst is prevented from falling off and which has high durability. In this case, if catalyst units made of bent metal plates as shown in FIGS. 3 and 4 are used, the need of spacers between the catalyst units can be eliminated.

Figure 22:
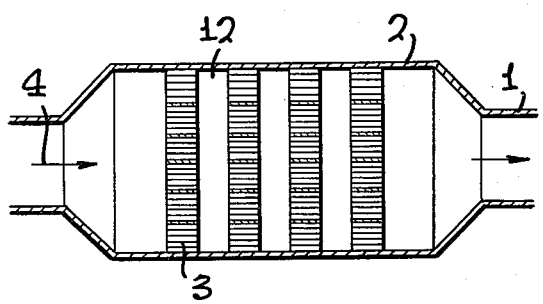
FIG. 22 is a cross-sectional view showing one embodiment of the apparatus for exhaust gas denitrification wherein the plate-shaped catalyst units according to the present invention are arranged.

FIG. 22 is a cross-sectional view showing a catalytic apparatus for NOx reduction of exhaust gas wherein the plate-shaped catalyst units 3 are arranged according to the present invention. Referring to the drawing, assemblies of plate-shaped catalyst units, in which a plurality of said catalyst units are each disposed in parallel with the gas flow and generally arranged across the gas flow, are arranged at a plurality of stages and at intervals 12 in parallel with the gas flow. If such intervals 12 are provided, then, even if deviated flows are generated when the exhaust gas pass through the assembly of the plate-shaped catalyst units, the deviated flows are stirred while passing through said intervals 12, so that the deviation of the gas flows can be lightened. The length of the intervals 12 may preferably be within the range from 10 to 100 times the interval between the adjacent catalyst units. Furthermore, the provision of the intervals 12 between the adjacent assemblies of the catalyst units facilitates cleaning the catalyst units from dust or soot. For example, soot blowing is performed to the intervals 12 to thereby easily remove dust or soot adherring to the catalyst.

Figure 23:
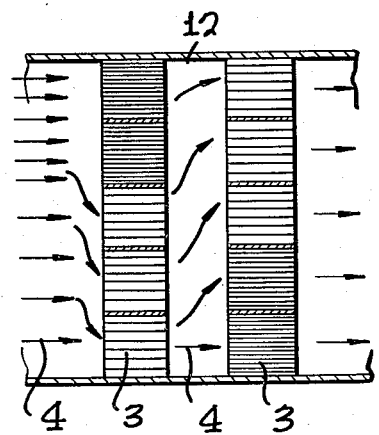
FIG. 23 is a cross-sectional view showing another embodiment of the apparatus for exhaust gas denitrification wherein the plate-shaped catalyst units according to the present invention are arranged.

FIG. 23 is a cross-sectional view showing further embodiment of the catalytic apparatus wherein the plate-shaped catalyst units according to the present invention are arranged. Referring to the drawing, in an assembly of catalyst units at the former stage in the gas flow, said catalyst units are arranged in such a manner that intervals between adjacent catalyst units arranged across the gas flow decrease upwardly from the bottom, and in an assembly of catalyst units at the latter stage, said catalyst units are arranged in such a manner that intervals between adjacent catalyst units across the gas flow increase upwardly from the bottom. The arrangement of the catalyst units as above has the effect of correcting the deviation of the gas flows by the provision of the intervals 12, and moreover, makes the flow path of gas longer and facilitates mixing of the gas between the intervals 12, thus further enabling to reduce the deviation of the gas flows passing through the catalyst units.

As has been described so far, according to the present invention, a plate-shaped catalyst unit wherein the catalytic substance is highly resistant to peel-off can be obtained. Such a catalyst unit is readily manufactured, and assembling and exchanging thereof are easily perfomed in use. Furthermore, a parallel-flow type apparatus for NOx reduction of exhaust gas which consists of the aforesaid catalyst units presents various advantages that resistance of the exhaust gas flows is low, build-up dust is also low and so forth.

Figure 24:
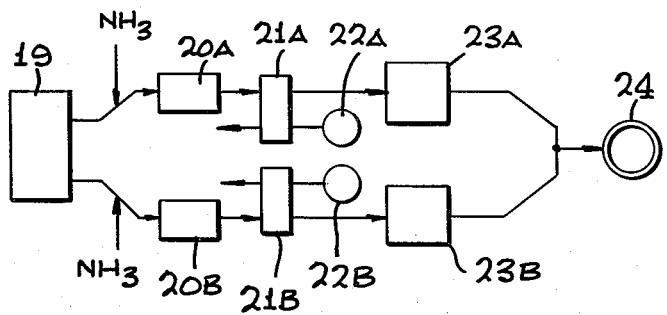
FIG. 24 is a flow sheet showing the process for $NO_x$ reduction.

FIG. 24 is a flow sheet showing the process for NOx reduction of exhaust gas in the use of the catalytic reactor according to the present invention. Referring to the drawing, exhaust gas exhausted from a fuel oil boiler 19 is added with ammonia at the intermediate portion of a duct, and thereafter, introduced into a catalytic reactor 20A or 20B. Nox contained in the exhaust gas is reduced to $N_2$ in the catalytic reactor 20A or 20B, subjected to heat exchange with air fed from a forced duct fan 22A or 22B in a heat exchanger 21A or 21B, thereafter, dusted in an electrostatic precipitator 23A or 23B, and discharged to outside through a stack 24.

Said catalytic reactor 20A or 20B has a construction analogous to the one shown in FIG. 1. The plate-shaped catalyst units arranged in said catalytic reactor are made of ASTM type 430 stainless steel plates in which a multiplicity of slits of short length are rendered in alternate and intermittent manner, and drawn to a length of 1.4 times the original length thereof to be formed into expanded metals (The apparent plate thickness is about 1 mm). The expanded metals thus obtained are sprayed thereupon with molten metal of ASTM type 430 stainless steel at the rate of 1.4 kg/m$^2$ (The thickness of molten metal layer ranges from 0.1 to 0.5 mm), and rough surfaces thus obtained are further deposited thereon with a catalytic substance composed of titanium, vandium and molybdenum to a thickness of 0.1 to 0.5 mm by press work.

One example of the use condition of the aforesaid apparatus for NOx reduction of exhaust gas is shown in Table 1.

TABLE 1

| Item | Dimension | Estimated value |
| --- | --- | --- |
| Flow rate of treated gas (wet base) | Nm$^3$/h | 1,910,000 |
| Inlet gas temperature (at MCR)* | °C. | 380 |
| Inlet gas composition | | |
| NOx(Dry) | ppm | 80 ($O_2$ calculated at 4%) |
| $O_2$(Dry) | vol % | 1.5 |
| $H_2O$ | vol % | 8.13 |
| Concentration of outlet NOx (Dry) | ppm | 16 ($O_2$ calculated at 4%) |
| NO$_2$ reduction rate | % | 80 and more |
| Apparatus installed place | — | Between Economizer and Air preheater |

*MCR means the maximum continuous rating.

Figure 25:
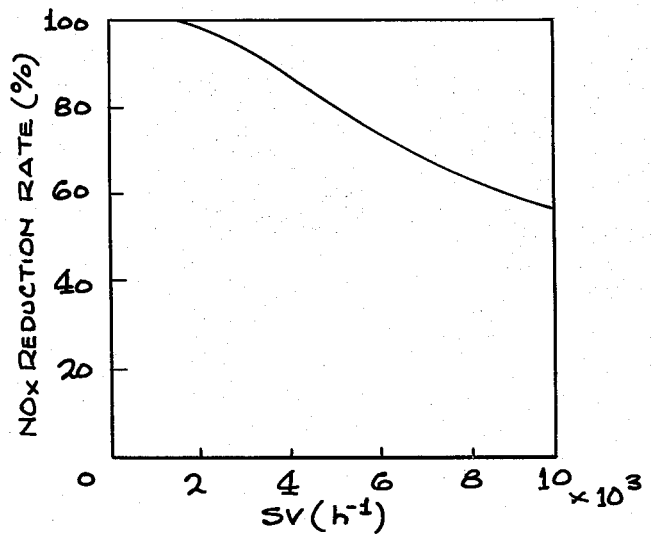
FIG. 25 illustrates the relationship between the space velocity and $NO_x$ reduction rate.

FIG. 25 shows the relationship between the space velocity (SV) and NOx reduction rate of the catalytic reactor 20A or 20B in the case exhaust gas is treated in accordance with the flow sheet in FIG. 24. In this case, the temperature in the catalytic reactor is 350° C., [NH$_3$]/[NOx] (molar ratio) is 1.1, and the linear velocity (LV) of the gas is 7 m/sec. As known from the drawing, in order to obtain NOx reduction rate of 80% or more, the value of SV should be set at about 5000 h$^{-1}$ or less.

Figure 26:
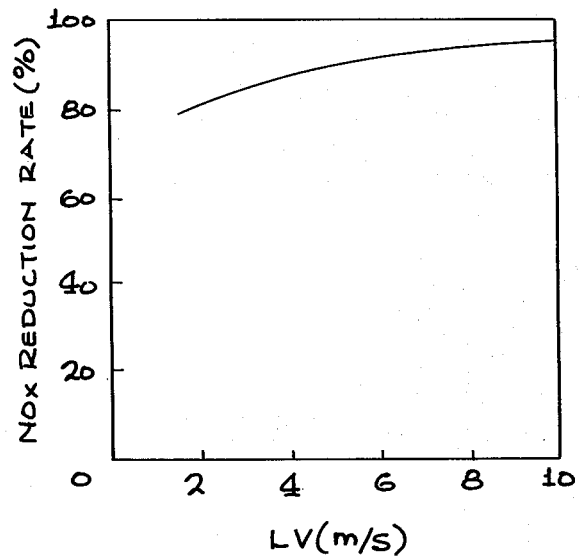
FIG. 26 illustrates the relationship between the linear velocity and $NO_x$ reduction rate.

Next, FIG. 26 shows the relationship between the linear velocity (LV) and NOx reduction rate of exhaust gas in the case SV of the catalytic reactor is 5000 h$^{-1}$, the temperature of gas is 350° C., and [NH$_3$]/[NOx] (molar ratio) is 1.1. As known from the drawing, in order to obtain NOx reduction rate of 87% or more, the value of LV should be set at 2 m/sec. or more.

Figure 27:
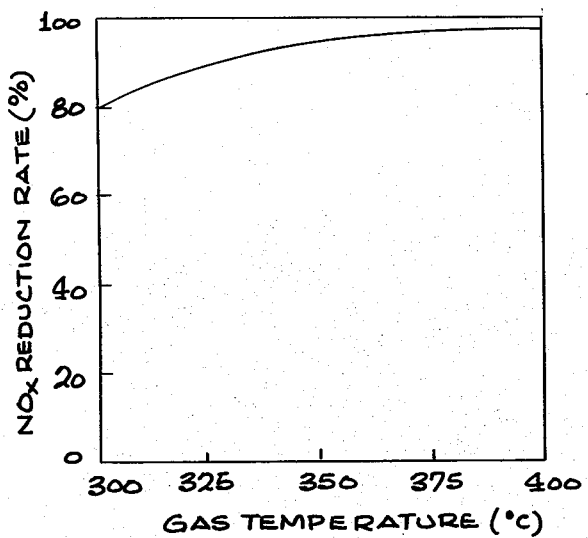
FIG. 27 illustrates the relationship between the gas temperature and $NO_x$ reduction rate.

Further, FIG. 27 shows the relationship between the temperature of gas and NOx reduction rate in the case SV of the catalytic reactor is 3000h$^{-1}$, [NH$_3$]/[NOx] (molar rate) is 1.1, and LV is 7 m/sec. As apparent from the drawing, NOx reduction rate of 80% or more is obtainable within the temperature range from 300° to 400° C.

Figure 28:
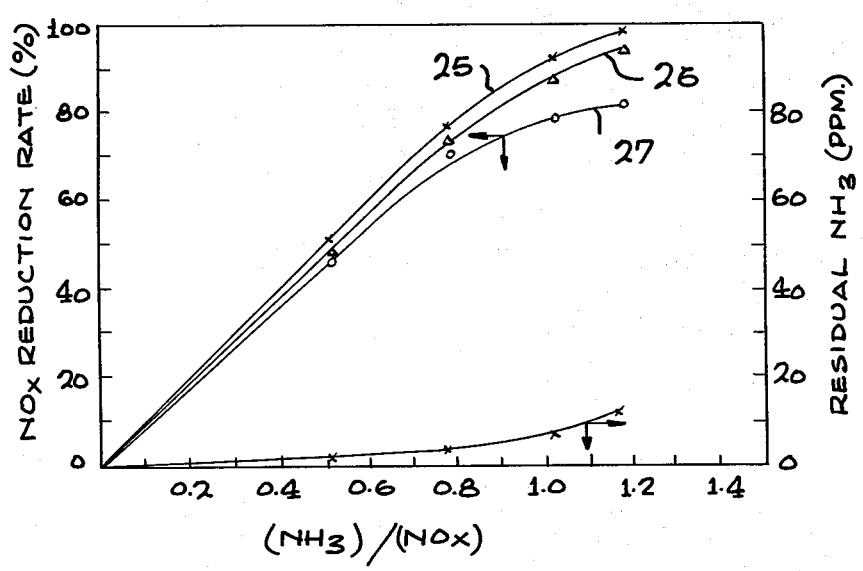
FIG. 28 illustrates the relationship between the molar ratio and $NO_x$ reduction rate.

FIG. 28 shows the relationship between [NH$_3$]/[NOx] (molar ratio) and NOx reduction rate in the case the flow rate of gas in the catalytic reactor is 2000 Nm$^3$/h, the temperature of gas is 350° C., and LV is 5.9 m/sec. In the drawing, designated at reference numerals 25, 26 and 27 are the case of SV being 10000h$^{-1}$, the case of SV being 5000h$^{-1}$, and the case of SV being 2500h$^{-1}$, respectively. Additionally, a curve 28 indicates the relationship between [NH$_3$]/[NOx] (molar ratio) and the residual NH$_3$, contained in the exhaust gas being discharged from the catalytic reactor in the case of SV being 2500h$^{-1}$ under the same conditions as described above. As apparent from the drawing, NOx reduction rate of 80% or more is obtainable when said molar ratio is set at about 0.9 or more in the case of SV being 5000h$^{-1}$ or more, and when said molar ratio is set at about 1.2 or more in the case of SV being 2500h$^{-1}$, and moreover, the residual NH$_3$ is also low.

What is claimed is:

1. A catalytic apparatus for NOx reduction of exhaust gas comprising a plurality of plate-shaped catalyst units each disposed in parallel with the gas flow and generally arranged across the gas flow, each of said catalyst units being produced by a method comprising the steps of spraying molten metal upon the surfaces of a metal plate to allow the molten metal to accumulate thereon to form rough surfaces and depositing a catalyst containing titanium and at least another catalytic material for NO$_x$ reduction of exhaust gas onto said rough surfaces whereby the catalyst is firmly secured on said rough surfaces.

2. A catalytic apparatus for NOx reduction of exhaust gas according to claim 1 wherein said plurality of catalyst units are arranged in assemblies and said assemblies are further arranged at a plurality of stages and at intervals in parallel with the gas flow.

3. A catalytic apparatus for NOx reduction of exhaust gas according to claim 2 wherein in an assembly of catalyst units at the former stage in the gas flow, said catalyst units are arranged in such a manner that intervals between adjacent catalyst units arranged across the gas flow decrease upwardly from the bottom; in an assembly of catalyst units at the latter stage, said catalyst units are arranged in such a manner that intervals between adjacent catalyst units across the gas flow increase upwardly from the bottom; and such arrangements of the former and latter assemblies of the catalyst units are alternately provided in the direction of the gas flow.

* * * * *